April 30, 1957  R. L. FOX  2,790,220
PROCESS FOR MAKING JEWELRY
Filed Jan. 27, 1956  2 Sheets-Sheet 1
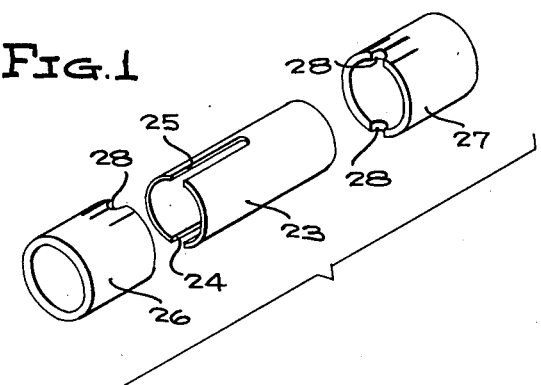
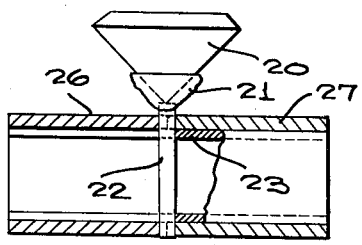
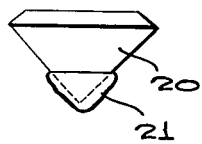
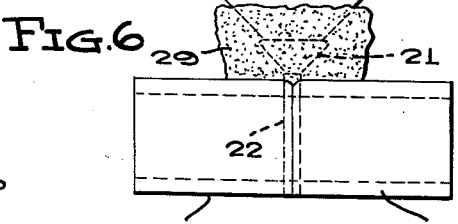
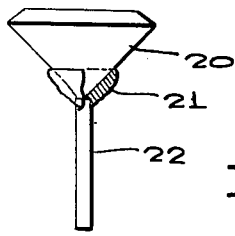
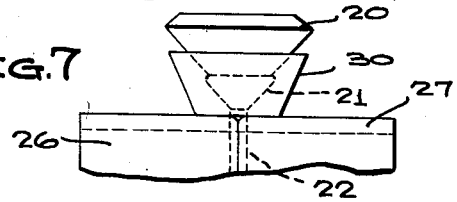
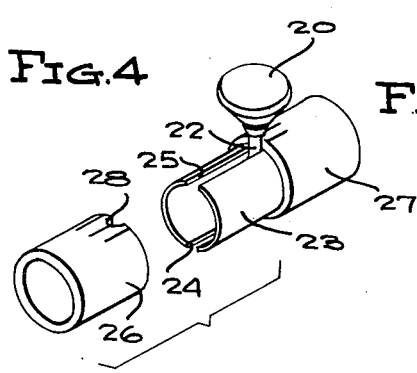
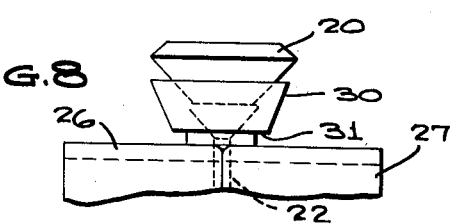
INVENTOR.
ROBERT L. FOX
BY
*McMorrow, Berman & Davidson*
ATTORNEYS

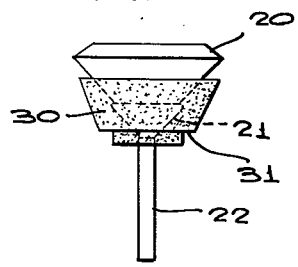
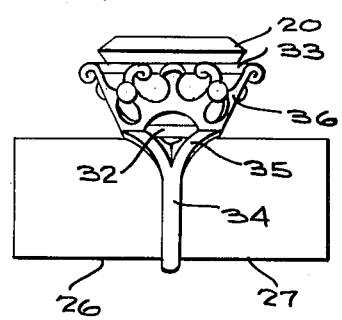
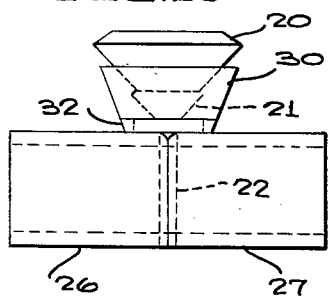
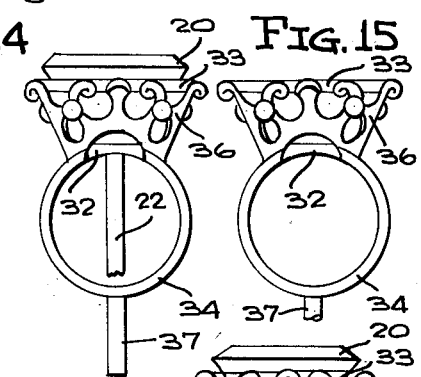
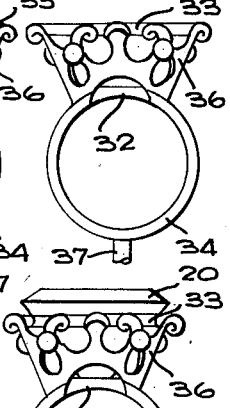
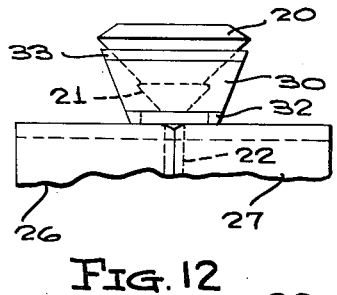
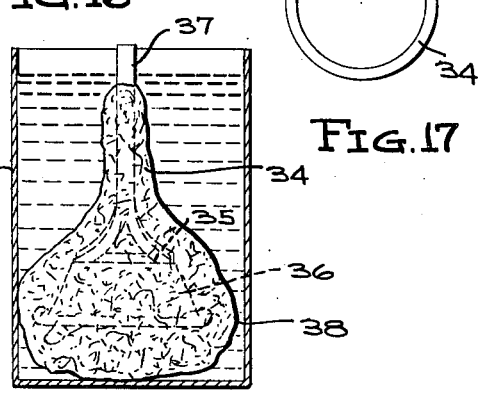

United States Patent Office 2,790,220
Patented Apr. 30, 1957

2,790,220

PROCESS FOR MAKING JEWELRY

Robert L. Fox, Tacoma, Wash.

Application January 27, 1956, Serial No. 561,761

5 Claims. (Cl. 22—196)

The present invention relates to a process for making jewelry.

An object of the present invention is to provide a process for making jewelry which enables the production of a mold having any desired pattern for a stone mounting.

Another object of the present invention is to provide a process for making a stone mounting in an original pattern, and one which saves time in the construction of the mounting without need for additional soldering, welding or binding.

A further object of the present invention is to provide a process for making stone mountings in which each mounting is made to fit the particular stone or jewel to be mounted, one which allows finer and more intricate designs in the stone mounting, one in which the mounting casting is produced without voids due to undercuts or indentations, and one in which the mounting casting is produced without porosity.

A still further object of the present invention is to provide a process for making jewelry which may be adapted for the manufacture of other articles in many lines of the industry other than the precious metals industry.

These and other objects and advantages of the present invention will be fully apparent from the following description when taken in connection with the annexed drawings, in which:

Figure 1 is an exploded view of the holding element employed in carrying out the process of the present invention, Figures 2 to 16, inclusive, illustrate graphically the steps of one embodiment of the process according to the present invention, and Figure 17 is a view of the jewelry article resulting from the practice of the one embodiment of the present invention.

In carrying out the process for making jewelry according to the present invention, the following steps are taken:

First the stone, designated by the reference numeral 20 is placed in a mount 21 formed of soft wax of a particular color. One such wax is red utility wax available to dental technicians and possessing soft and sticky characteristics. The stone 20 is so positioned in the mount 21 that the under portion of the stone 20 is embraced by the mount 21, as seen in Figure 2. Next, the mount 21 is fixed to a stem 22 formed of a hard wax of another color, such as blue, as seen in Figure 3. A hot iron is used to firmly attach the stem 22 to the mount 21 with the stem 22 pushed into the mount 21 until it barely touches the bottom of the stone 20. If the above-described red wax is used for the mount 21, it will be found to be nearly transparent and when the mount 21 is held to the light, the position of the stem 22 relative to the stone 20 will be easily seen. The hot iron is used to soften the mount 21 so that the stone 20 can be positioned in a level position. Next, the stem 22 is supported in a hollow tubular holding element which rests horizontally upon a supporting surface in an upright position with the mount 21 at the top of the stem 22 and horizontally spaced above the element, the latter being shown in Figure 1 and consisting in a central part or core 23 having longitudinally arranged slots 24 and 25 extending inwardly from one end to a point substantially midlength of the core 23. The slots 24 and 25 are arranged on opposite sides of the core 23. The hollow tubular holding element includes a pair of cylindrical members 26 and 27 each having an internal diameter such that it slides freely but snugly on the core 23 and having an external diameter for a particular size of ring to be manufactured. Each of the cylindrical members 26 and 27 is provided with a semicylindrical notch 28 of the same size as the slot 24 and 25 and disposed on each side of the cylindrical member. In Figure 4, the stem 22 has been placed in the slots 24 and 25 in the core 23 and the one cylindrical member 27 has been moved into a position so that the adjacent portion of the stem 22 is received in its semicylindrical notches 28. In Figure 5, the other cylindrical member 26 has been moved up to the position in which the stem 22 is received within its semicylindrical notches. It will be seen in Figure 5 that the stem 22 is of such length as to project completely through the assembled cylindrical members 26 and 27 with the mount 21 horizontally spaced above the cylindrical members 26 and 27. The red wax of the mount 21 may be again softened with the hot iron to adjust the position of the stone with respect to the hollow tubular holding element so that the upper face of the stone is horizontal.

The next step consists in applying a sheath 29 of core plaster and of the desired configuration about the mount 21 on the adjacent portion of the stone 20. The core plaster is preferably the same that is available to dental technicians and should be mixed thick enough so that it will not flatten out easily and it should be applied to the mount 21 and the adjacent portion of the stone 20 by means of a camel's-hair brush. It should be applied so that it covers all of the mount 21 and the adjacent portion of the stem 22. A sufficient amount of the core plaster should be applied, as shown in Figure 6, so that when it has partially set it may be trimmed by a sharp blade to the form shown in Figure 7. The core plaster sheath, as shown in Figure 7 and designated by the numeral 30, determines the shape of the inside of the ring underneath the stone when the ring is finished. It is desirable to taper the sheath 30 from its upper end toward the stem 22 and the next step consists in forming a groove 31 extending about the boundary of the sheath adjacent the base of the latter, the groove 31 not extending clear through to the stem 22 but leaving the base of the sheath 30.

The next step consists in removing the stem with the attached mount 21, the stone 20, and the sheath 30 from the hollow tubular holding element consisting of the core 23 and the cylindrical members 26 and 27. This is accomplished by pulling the cylindrical member 26 off the core 23 and by gently pushing the stem 22 out of the slots 24 and 25. The next step consists in applying one or more coats of a protective coating such as mucilage as in Figure 9 to the outer face of the sheath 30 and to all parts of the sheath 30 including the groove 31 excepting the base or bottom face of the sheath 30. After the mucilage has dried, the stem 22 carrying the coated sheath 30 is replaced in the slots 24 and 25 in the core 23 and the cylindrical members 26 and 27 are moved up to the position at which their notches 28 surround the adjacent portions of the stem 22 with the stem 22 in an upright position and with the sheath 30 exteriorly of the cylindrical members 26 and 27 and having the bottom face of the sheath 30 resting upon the adjacent portions of the cylindrical members 26 and 27.

The next step of the process is shown in Figure 10 in which a collar 32 fabricated of wax of the same hardness and color as that of which the stem 22 has been formed. The collar 32 entirely fills the groove 31 in the lower end portion of the sheath. The next step in the process consists in forming a girdle 33 between the rim of the stone 20 and the top of the sheath 30 from wax which is soft and is of still another color, such as green. The girdle 33 in its assembled position is shown in Figure 11.

Next, a ring 34 having separated ends is formed from a wax of medium hardness and of still another color, such as pink, and is positioned around the abutting ends of the cylindrical members 26 and 27. The separated ends of the ring 24 are split as at 35 and are attached to the collar 32. The hot iron is again used so that a good bond is obtained between the split ends 35 of the ring 34 with the adjacent portions of the collar 32.

The next step of the process consists in applying a decorative design in wax about the external portion of the sheath 30 and attaching the wax pattern to the collar 32 and to the girdle 33 to form a jewelry pattern in wax about the stone 20. The wax pattern, when applied is shown in Figure 13 and indicated by the reference numeral 36. Next, the wax pattern assembly, including the collar 32, the girdle 33, the stone 20, the enclosed sheath 30 with its supporting mount 21 and the stem 22 is removed from the cylindrical members 26 and 27 by taking the cylindrical member 26 off of the core 23 and sliding the stem 22 out of the slots 24 and 25, and a hot iron or a blade is again used and the lower end of the stem 22 is separated from the intermediate portion of the ring 34. Next, a shank 37 formed of hard wax of the same hardness and color as that of which the stem 22 has been formed is attached to the outer periphery of the ring 34 intermediate its ends, resulting in the assembly as shown in Figure 14.

After the shank 37 has been attached to the ring 34, the wax pattern assembly including the enclosed sheath 30 and stone 20 and stem 22 is submerged in a liquid which will dissolve the sheath 30. A suitable liquid for this purpose consists in one part of sulfuric acid of a strength approximately 66% and one part water mixed together. The reason for leaving the bottom face of the sheath 30 uncoated is now apparent. It is through this bottom face that the acid solution attacks and dissolves the sheath 30, leaving the collar 32 and the girdle 33 and the decorative design 36 which connects the collar and the girdle together, the ring 34 with its attached shank 37, and the stone 20 and the stem 22 and mount 21. The stone 20 and stem 22 are then removed from the wax pattern assembly, resulting in the assembly as shown in Figure 15.

The next step of the process consists in forming a rigid encasement 38 of casting investment plaster about the assembly of the collar 32, the girdle 33, the decorative design and the ring 34 with the attached shank 37, excepting the upper end of the shank 37 when the assembly is in the inverted position shown in Figure 16. The encasement 38 of plaster is next inserted within a container 39 having therein a quantity of settable casting investment plaster in liquid form, the body of liquid plaster, when hardening, forming a mold having the jewelry wax pattern therein.

The next step of the process is to subject the thus formed mold to heat to eliminate the wax and to leave the mold with a jewelry pattern of the removed wax. The shank 37, after it has melted, leaves an opening into the mold through which a melted precious metal may be introduced to reproduce the wax pattern assembly in a precious metal. After the article of jewelry formed in the mold has cooled, the mold is broken away from the article and the sprue which formed in the passage in the mold left by the shank 37 is cut from the ring 34 and the ring is finished in a suitable manner.

The stone 20 may then be reinserted within the ring mounting formed in the mold by means of tongs, resulting in the finished article, as seen in Figure 17, requiring no soldering, welding or other means of mounting the stone therein. The stone 20 will be found to seat perfectly within the reproduced collar 32 and the girdle 33.

Other articles and rings may be manufactured using the process of the present invention. The step of forming a ring and attaching the same to the collar may be omitted. A shank to form a sprue may be attached to any portion of the wax pattern assembly and the sheath may then be dissolved to separate the stone and stem from the wax pattern. The wax pattern may then be embedded in the casting investment plaster and when the latter has hardened, the wax pattern may be melted therefrom to form a mold into which melted metal may be poured. The process for making jewelry of the present invention lends itself readily to the manufacture of other articles besides jewelry and provides a method by which any object may be quickly and positively mounted in a cast metal support without subjecting the object to heat.

What is claimed is:

1. In the process for making jewelry, the steps of placing a stone in a mount formed of soft wax of a particular color so that the under portion of the stone is embraced by said mount, affixing said mount to one end of a stem formed of hard wax of another color, supporting said stem in a hollow tubular holding element resting horizontally upon a supporting surface in an upright position with the mount at the top of the stem and horizontally spaced above said element, applying a sheath of core plaster and of the desired configuration about said mount and the adjacent portion of said stone, forming a groove extending about the boundary of said sheath adjacent the base of the latter, removing the stem carrying the mount, stone, and sheath from said element, coating all of the sheath except the bottom face with a protective coating, placing the stem carrying the coated sheath in said holding element so that the stem is in an upright position with the sheath exteriorly of said holding element and having its uncoated bottom face resting upon said holding element, forming a collar in said sheath groove with wax of the same hardness and color as that of which said stem has been formed, forming a girdle between the rim of the stone and the top of said sheath with a soft wax of still another color, applying a decorative design in wax about the external portion of said sheath and attaching same to said collar and girdle to thereby form a jewelry pattern in wax about said stone, removing said wax pattern from said holding element, dissolving said sheath from said wax pattern assembly, removing said stone and stem from said assembly, attaching one end of a shank formed of hard wax of the same hardness and color as that of which the stem has been formed to said assembly, forming a rigid encasement of casting investment plaster about all of the thus formed assembly except the portion adjacent the free end of said shank, submerging the thus formed encasement in a liquid body of settable casting investment plaster to form a mold having the jewelry wax pattern therein, and subjecting the thus formed mold to heat to eliminate the wax and leave the mold with the jewelry pattern of the removed wax.

2. In the process for making jewelry, the steps of placing a stone in a mount formed of soft wax of a particular color so that the under portion of the stone is embraced by said mount, affixing said mount to one end of a stem formed of hard wax of another color, supporting said stem in a hollow tubular holding element resting horizontally upon a supporting surface in an upright position with the mount on the top of the stem and horizontally spaced above said element, applying a sheath of core plaster and of the desired configuration about said mount and the adjacent portion of said stone, forming a groove extending about the boundary of said sheath adjacent the base of the latter, removing the stem carrying the mount, stone, and sheath from said element, coating all of the sheath except the bottom face with a protective coating, placing the stem carrying the coated sheath in said holding element so that the stem is in an upright position with the sheath exteriorly of said holding element and having its uncoated bottom face resting upon said holding element, forming a collar in said sheath groove with wax of the same hardness and color as that of which said stem has been formed, forming a girdle between the rim of the stone and the top of said sheath with a soft wax of still another color, applying a decorative design in wax about the external portion of said sheath and attaching same to said collar and girdle to thereby form a jewelry pattern in wax about said stone, removing said wax pattern from said holding element, dissolving said sheath from said wax pattern assembly, removing said stone and stem from said assembly, attaching one end of a shank formed of hard wax of the same hardness and color as that of which the stem has been formed to said assembly, forming a rigid encasement of casting investment plaster about all of the thus formed assembly except the portion adjacent the free end of said shank, submerging the thus formed encasement in a liquid body of settable casting investment plaster to form a mold having the jewelry wax pattern therein, subjecting the thus formed mold to heat to eliminate the wax and leave the mold with the jewelry pattern of the removed wax, and casting a precious metal in said mold.

3. The process for making jewelry, the step of placing a stone in a mount formed of soft wax of a particular color so that the under portion of the stone is embraced by said mount, affixing said mount to one end of a stem formed of hard wax of another color, supporting said stem in a hollow tubular holding element resting horizontally upon a supporting surface in an upright position with the mount at the top of the stem and horizontally spaced above said element, applying a sheath of core plaster and of the desired configuration about said mount and the adjacent portion of said stone, forming a groove extending about the boundary of said sheath adjacent the base of the latter, removing the stem carrying the mount, stone, and sheath from said element, coating all of the sheath except the bottom face with a protective coating, placing the stem carrying the coated sheath in said holding element so that the stem is in an upright position with the sheath exteriorly of said holding element and having its uncoated bottom face resting upon said holding element, forming a collar in said sheath groove with wax of the same hardness and color as that of which said stem has been formed, forming a girdle between the rim of the stone and the top of said sheath with a soft wax of still another color, forming a ring having separated ends with wax of medium hardness and of still another color about said tubular element, attaching the separated ends of said ring to said collar, applying a decorative design in wax about the external portion of said sheath and attaching same to said collar and girdle to thereby form a jewelry pattern in wax about said stone, removing said wax pattern assembly from said holding element, separating the bottom end of said stem from the intermediate portion of said ring, attaching a shank formed of hard wax of the same hardness and color as that of which the stem has been formed to the outer periphery of said ring intermediate its ends, dissolving said sheath from said wax pattern assembly, removing said stone and stem from said assembly, forming a rigid encasement of casting investment plaster about all of the thus formed assembly except the portion adjacent the free end of said shank, submerging the thus formed encasement in a liquid body of settable casting investment plaster to form a mold having the jewelry wax pattern therein, and subjecting the thus formed mold to heat to eliminate the wax and leave the mold with the jewelry pattern of the removed wax.

4. The process for making jewelry which comprises placing a stone in a mount formed of soft wax of a particular color so that the under portion of the stone is embraced by said mount, affixing said mount to one end of a stem formed of hard wax of another color, supporting said stem in a hollow tubular holding element resting horizontally upon a supporting surface in an upright position with the mount at the top of the stem and horizontally spaced above said element, applying a sheath of core plaster and of the desired configuration about said mount and the adjacent portion of said stone, forming a groove extending about the boundary of said sheath adjacent the base of the latter, removing the stem carrying the mount, stone, and sheath from said element, coating all of the sheath except the bottom face with a protective coating, placing the stem carrying the coatedسheath in said holding element, so tha the stem is in an upright position with the sheath exteriorly of said holding element and having its uncoated bottom face resting upon said holding element, forming a collar in saidسheath groove with wax of the same hardness and color as that of which said stem has been formed, forming a girdle between the rim of the stone and the top of said sheath with a soft wax of still another color, forming a ring having separated ends with wax of medium hardness and of still another color about said tubular element, splitting each of the separated ends, of said ring and attaching the split portions of each ring end to said collar, applying a decorative design in wax about the external portion of said sheath and attaching same to said collar and girdle to thereby form a jewelry pattern in wax about said stone, removing said wax pattern assembly from said holding element, separating the bottom end of said stem from the intermediate portion of said ring, attaching a shank formed of hard wax of the same hardness and color as that of which the stem has been formed to the outer periphery of said ring intermediate its ends, dissolving said sheath from said wax pattern assembly, removing said stone and stem from said assembly, forming a rigid encasement of casting investment plaster about all of the thus formed assembly except the portion adjacent the free end of said shank, submerging the thus formed encasement in a liquid body of settable casting investment plaster to form a mold having the jewelry wax pattern therein, and subjecting the thus formed mold to heat to eliminate the wax and to leave the mold with the jewelry pattern of the removed wax.

5. The process for making jewelry which comprises placing a stone in a mount formed of soft wax of a particular color so that the under portion of the stone is embraced by said mount, affixing said mount to one end of a stem formed of hard wax of another color, supporting said stem in a hollow tubular holding element resting horizontally upon a supporting surface in an upright position with the mount at the top of the stem and horizontally spaced above said element, applying a sheath of core plaster and of the desired configuration about said mount and the adjacent portion of said stone, forming a groove extending about the boundary of said sheath adjacent the base of the latter, removing the stem carrying the mount, stone, and sheath from said element, coating all of the sheath except the bottom face with a protective coating, placing the stem carrying the coated sheath in said holding element so that the stem is in an upright position with the sheath exteriorly of said holding element and having its uncoated bottom face resting upon said holding element, forming a collar in said sheath groove with wax of the same hardness and color as that of which said stem has been formed, forming a girdle between the rim of the stone and the top of said sheath with a soft wax of still another color, forming a ring having separated ends with wax of medium hardness and of still another color about said tubular element, splitting each of the separated ends of said ring and attaching the split portions of each ring end to said collar, applying a decorative design in wax about the external portion of said sheath, and attaching same to said collar and girdle to thereby form a jewelry pattern in wax about said stone, removing said wax pattern assembly from said holding element, separating the bottom end of said stem from the intermediate portion of said ring, attaching a shank formed of hard wax of the same hardness and color as that of which the stem has been formed to the outer periphery of said ring intermediate its ends, dissolving said sheath from said wax pattern assembly, removing said stone and stem from said assembly, forming a rigid encasement of casting investment plaster about all of the thus formed assembly except the portion adjacent the free end of said shank, submerging the thus formed encasement in a liquid body of settable casting investment plaster to form a mold having the jewelry wax pattern therein, subjecting the thus formed mold to heat to eliminate the wax and leave the mold with the jewelry pattern of the removed wax, and casting a precious metal in said mold.

References Cited in the file of this patent

UNITED STATES PATENTS

| | | |
|---|---|---|
| 1,554,697 | Alden | Sept. 22, 1925 |
| 2,072,194 | Anastor | Mar. 2, 1937 |
| 2,118,468 | Jungersen | May 24, 1938 |
| 2,200,449 | Jungersen | May 14, 1940 |
| 2,607,969 | Evans | Aug. 26, 1952 |